March 19, 1946.  C. E. FRASER  2,396,779
FILTER CLEANING MECHANISM
Filed Jan. 13, 1943  4 Sheets-Sheet 4
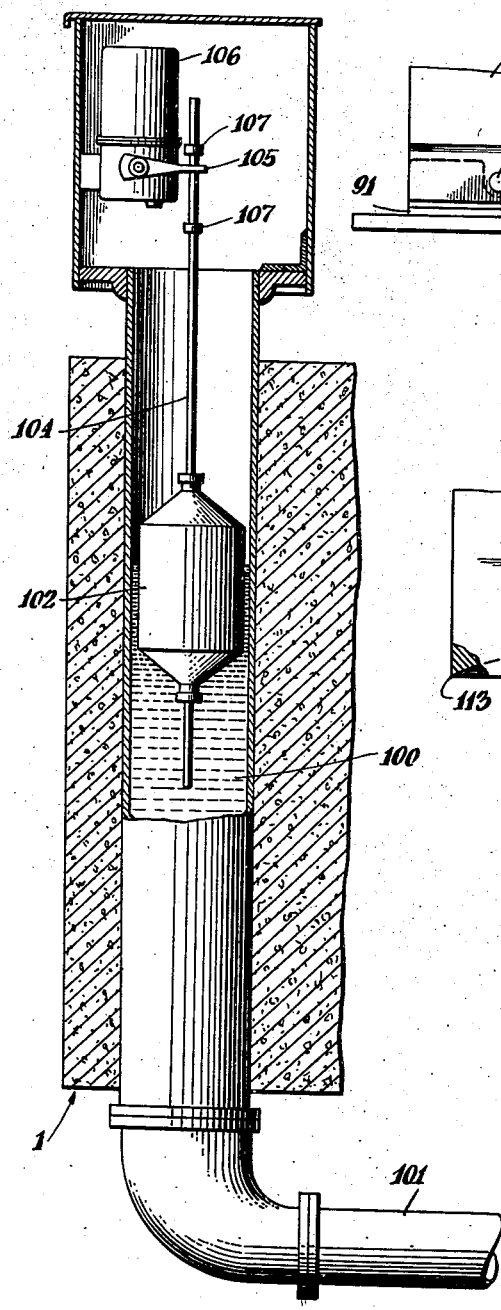
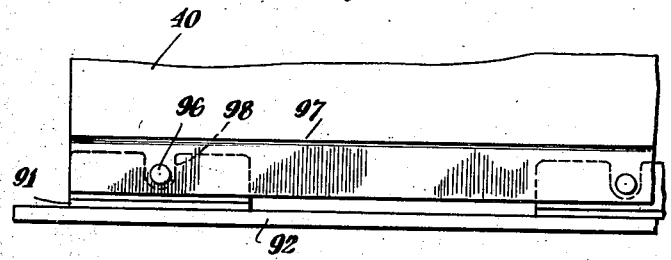
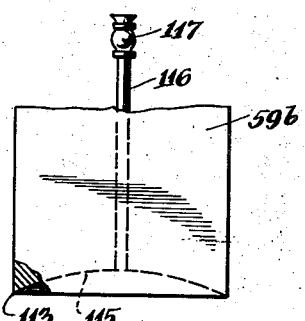
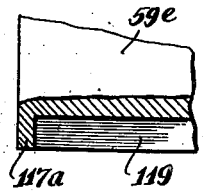
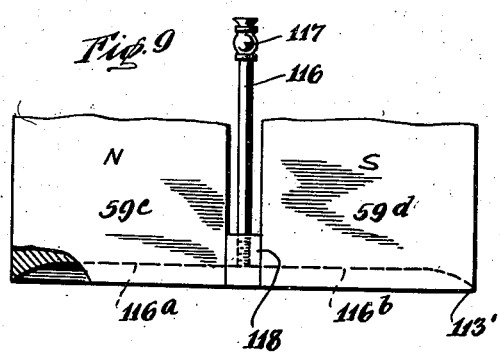
INVENTOR.
Charles E. Fraser
BY
Norman H. Holland
ATTORNEY

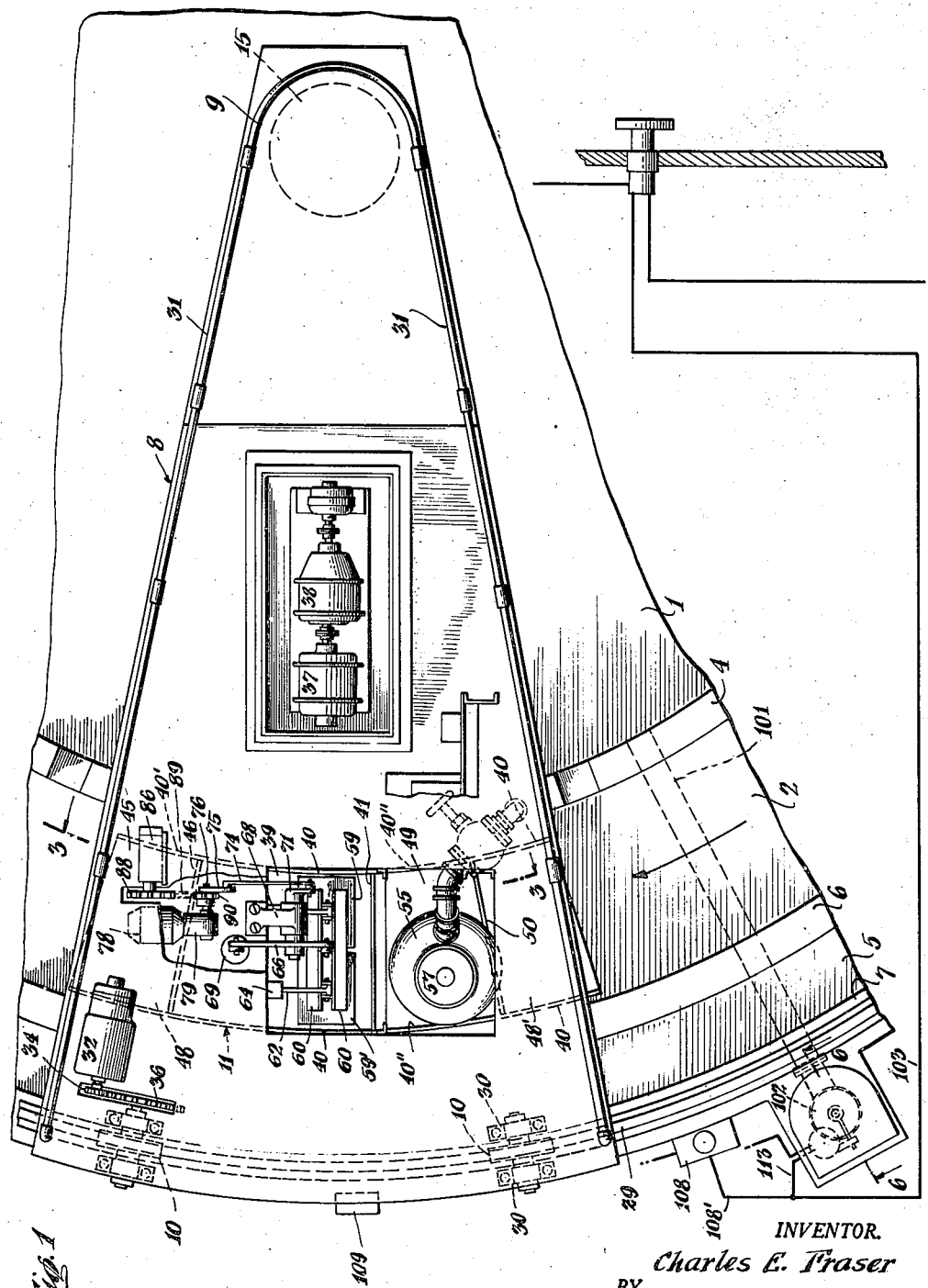

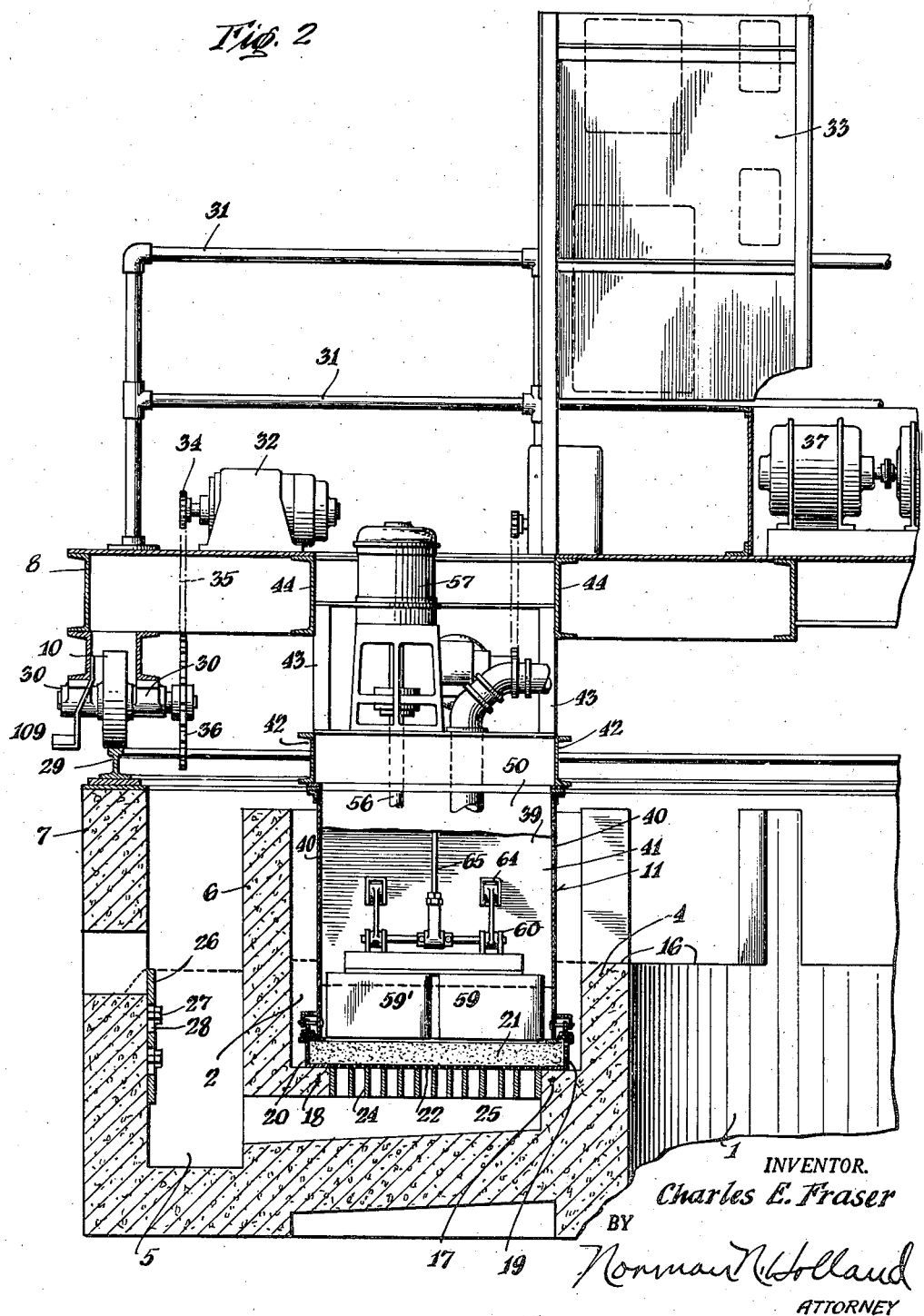

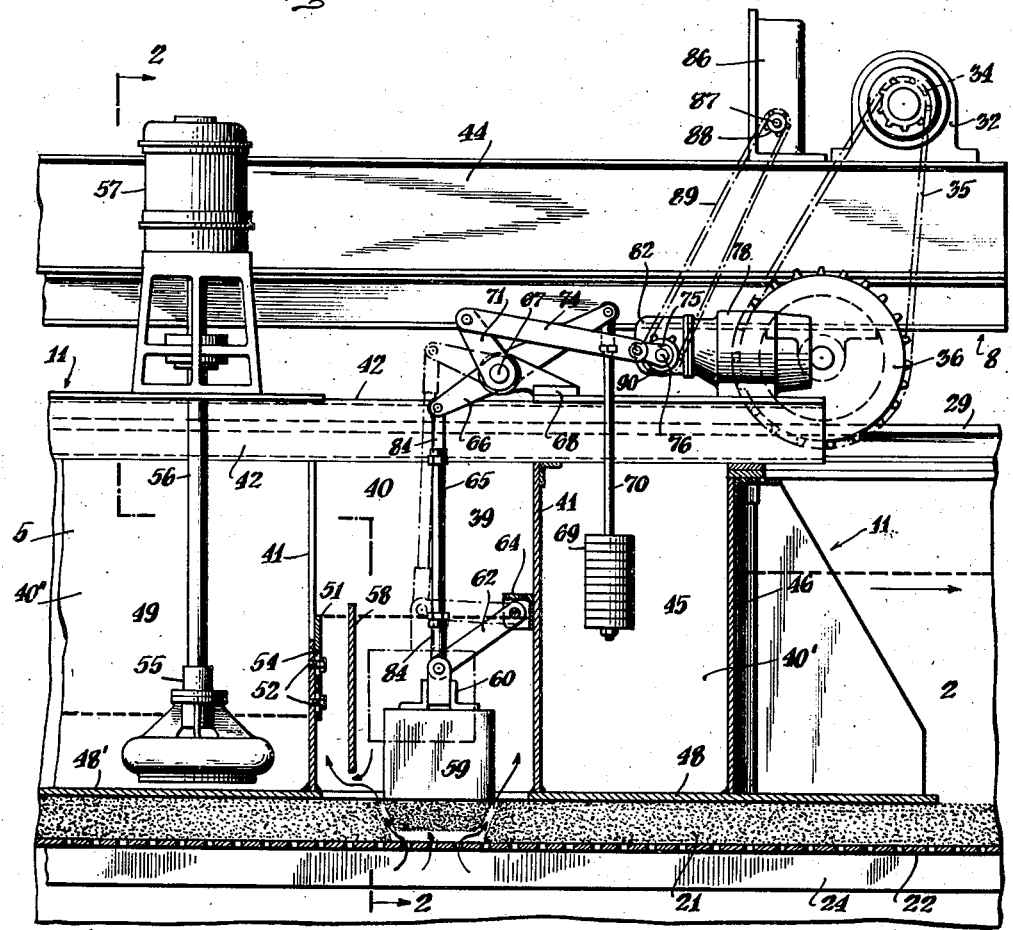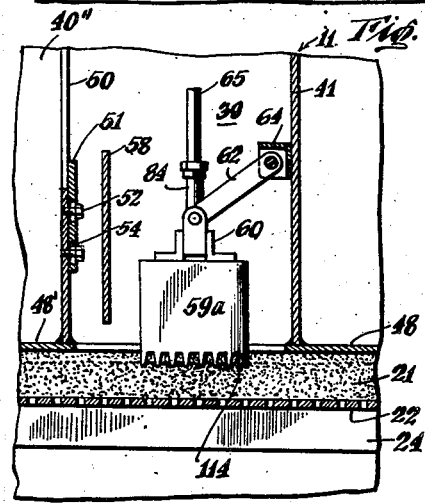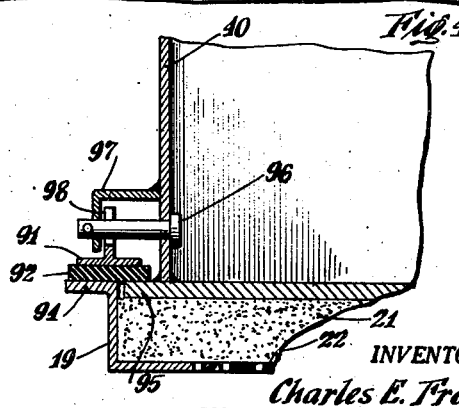

UNITED STATES PATENT OFFICE 2,396,779

FILTER CLEANING MECHANISM

Charles E. Fraser, Clearwater, Fla.

Application January 13, 1943, Serial No. 472,277

22 Claims. (Cl. 210—128)

The present invention relates to filtration equipment and more particularly to a clarification filter and to a traveling cleaner therefor.

As the standards of sanitation requirements increase, the demand for service from filtration equipment increases correspondingly. The most difficult problem is efficient and frequent cleaning of the filter beds. Filters generally utilize a bed of pulverized material through which the liquid to be filtered is passed. In some cases, the liquid is passed upwardly through the bed, commonly known as an upflow filter, and in other cases, downwardly through the bed, commonly known as a downflow filter. In passing through the bed, the particles in the liquid being filtered lodge in the bed usually on and adjacent to the surface where the liquid enters. After a period, in some cases a few minutes and in other cases a few hours, the interstices in the bed become clogged and the efficiency and the capacity of the filter decrease rapidly and the bed has to be cleaned. In some cases, the bed is shut down for cleaning, with the resultant loss of use for a substantial period and the requirement of extensive labor and machinery in the cleaning operation. In other cases, traveling cleaners are utilized which pass over the surface of the bed and remove the particles by washing the bed or by some other means. Such cleaners avoid the loss of use of the filter, but they are under the handicap of having to work on a bed covered with a liquid and hence the working parts are submerged therein. In addition, operations have to be avoided which will permit unfiltered liquid to pass into the filtered liquid on the opposite side of the bed without filtration thereof.

The present invention relates generally to the traveling type of cleaner and more particularly, it is an improvement upon the type of filter illustrated in applicant's prior Patent No. 2,204,534, granted June 11, 1940, although certain of its features may be utilized in other filters using either sand or magnetite as the filtering material and there is no intention of limiting the scope of the present invention to the particular construction illustrated in said patent, which comprises a cleaner passing periodically over a filter bed made of magnetite. The cleaner in the above-identified patent includes a magnet which raises the portion of the bed within its magnetic field and drops it so that the solids lodged therein may be washed out by liquid passed through it, while in its loose state, and removed from the cleaner as wash water. In order to avoid contamination of the filtered liquid, the level of the liquid in the cleaner is maintained below the level of the liquid on the outside thereof and the level of the filtered liquid is maintained higher than the level of the liquid in the cleaner; hence, there is a back pressure tending to cause filtered liquid to flow back through the bed into the cleaner in the area enclosed by the cleaner, thereby washing the magnetite which is raised from the bed by the magnet.

The present invention is an improvement upon the mechanism illustrated in said patent and aims to reduce the cost of the equipment, to increase the efficiency of the cleaning operation and to improve the seal between the cleaner and the filter bed.

An object of the invention is to provide an improved traveling cleaner adapted to remove filtered solids from a filter bed efficiently and effectively.

Another object of the invention is to provide an improved traveling cleaner for removing solids from a filter bed without stopping the filtering operation.

Another object of the invention is to reduce the cost of an efficient traveling cleaner for a filter bed.

Another object of the invention is to simplify the mechanism utilized in a traveling cleaner for cleaning a filter bed.

Another object of the invention is to reduce the cost of operation of a traveling cleaner.

Another object of the invention is to reduce the cost of equipment and the cost of operation thereof by minimizing the amount of current required to operate an electromagnet in a traveling cleaner.

Another object of the invention is to provide an efficient and inexpensive cleaner, certain features of which are applicable to sand filter beds as well as to magnetite beds.

Another object of the invention is to provide an improved seal between the traveling cleaner and the filter bed.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification wherein Fig. 1 is a top plan view of a filter with parts broken away and illustrates a traveling cleaner effective on the bed thereof;

Fig. 2 is a sectional view along the line 2—2 of Fig. 3, illustrating the relation of the parts;

Fig. 3 is a sectional view along the line 3—3 of Fig. 1 substantially transverse to the sectional view of Fig. 2, illustrating the mechanism for operating the magnet and other features;

Fig. 4 is a fragmentary sectional view illustrating details of the construction of the preferred form of seal between the cleaner and the sides of the filter bed;

Fig. 5 is a fragmentary side elevational view illustrating details of the seal shown in Fig. 4;

Fig. 6 is a fragmentary sectional view illustrating the automatic float control switch mechanism for the cleaner drive;

Fig. 7 is a fragmentary view illustrating a modified construction of the lower surface of the electromagnet;

Fig. 8 is a fragmentary view illustrating another modified construction of the bed engaging and retaining device;

Fig. 9 is a fragmentary view illustrating the principle of the device of Fig. 8 with combined north and south poles; and Fig. 10 is a fragmentary sectional view illustrating a further variation of the devices of Figs. 8 and 9.

Referring again to the drawings and more particularly to Figs. 1, 2 and 3, there is shown a filter and cleaner therefor illustrating a preferred embodiment of the invention. For convenience, the filter is illustrated as circular in construction, but it will be understood that it may be rectangular or any other desired shape. Described generally, there is a circular construction (Fig. 1), preferably of steel or concrete, divided into a settling tank 1 surrounded by a filtering channel 2 having a wall 4 separating it from the settling tank. An effluent channel 5 surrounds the filtering channel and is separated from it by a wall 6. The other wall 7 of the effluent channel forms the outer wall of the filter construction. A carriage 8 is mounted upon the filter and pivoted at one end 9 to the center of the settling chamber with its outer end movably mounted on the outer circular wall 7 by wheels 10 rolling on track 29. The carriage 8 supports a traveling cleaner which passes over the filter bed in the filter channel.

Described in more detail, the settling chamber 1 may have a central inlet 15 through which the liquid to be filtered is admitted to the settling chamber. The entrance 15 preferably extends through and upwardly beyond the bottom of the chamber and the entering liquid flows slowly out of it into the liquid which is already in the chamber and which is preferably above the top of the entrance 15. The liquid is permitted to remain in the settling chamber for a period until the heavier solids settle to the bottom, from which they may be removed. In operation, the height of the liquid in the settling chamber exceeds the level of the overflow recesses 16 in the wall 4 and the liquid passes into the filter channel 2. In the normal operation of the filter, the liquid in the filter channel 2 is slightly above the bottoms of the recesses 16 and therefore at the level of the liquid in the settling chamber. This permits less disturbance of the liquid and is conducive to better results. While the filter and cleaner are described in connection with a settling chamber it will be understood that the settling chamber may be omitted and the liquid flowed directly into the filter channel.

The filter channel 2 has extensions or shoulders 17 and 18 for supporting annular side members 19 and 20 forming runways for the traveling cleaner and also forming side walls for retaining the filtering material 21. The filtering material is supported at the bottom by a suitable screen 22 mounted on supporting members 24. The depth of the filter bed will depend upon the liquid to be filtered; for example, a three-inch bed may be sufficient for sewage, while a six-inch bed may be desirable for water. Likewise, the size, type and grade of the filter medium will depend upon the use for which the filter is designed. A passageway 25 below the supporting member leads to the effluent channel 5. Preferably, though not necessarily, the effluent channel extends completely about the filter channel and has a weir 26 adjustable in position by means of the bolts 27 in slots 28 to regulate the height of the liquid in the effluent channel. The adjustment of the weir 26 enables the difference in height between the top of the overflow recesses 16 and the level of the water in the effluent chamber to be regulated. Thus a suitable head may be maintained for forcing the flow of liquid downwardly through the filter bed 21.

It will be seen that the liquid to be filtered flows into the settling chamber through the inlet 15, overflows into the filtering channel 2 and passes through the filter bed 21 and the outlet 25 into the effluent channel 5. The filtered liquid passes from the effluent channel over the weir 26 and may be piped to any suitable place.

Referring in more detail to the carriage 8, the preferred embodiment illustrates a supporting structure pivoted at the central part 9 of the settling chamber by any suitable means with the outer end thereof supported by the wheels 10 traveling on a track 29 mounted on the outer wall 7 of the filter construction, which is also the outer wall of the effluent channel. The wheels 10 are mounted in brackets 30 which are attached to the outer end of the carriage 8. Suitable guard rails 31, formed of pipe or other suitable material, are provided at the sides of the carriage to permit persons to walk and work on the carriage without danger of falling off. A suitable motor 32 is attached to one of the wheels 10 by means of sprocket 34 on the motor shaft, chain 35 and sprocket 36 on the wheel shaft (Figs. 1 and 3). Thus the motor 32 rotates a wheel 10 and drives the carriage around the filter about its pivot 9 at the center of the settling chamber. The carriage 8 serves as a suitable support for a motor 37 and a generator 38 forming a motor generator set for converting the alternating current usually available to direct current, which is preferable for operating the electrical mechanisms of the cleaner. A panel board 33 on the carriage 8 may provide suitable electrical controls and connections. The traveling cleaner 11 and operating parts thereof are also supported on the carriage 8, which may be made of suitable angle irons, I-beams or similar structural members, covered with a suitable floor.

Referring more particularly to the traveling cleaner 11 (Figs. 1 to 3), a chamber 39 is formed by side walls 40 and end walls 41, which extend down into the liquid over the filter bed, preferably with their lower ends supporting a bottom plate 48 substantially in contact with the upper surface of the filter bed. The side members are secured to the supporting channel members 42 which in turn are secured by vertical members 43 to the channel members 44 forming the supporting base for the carriage 8. The carriage moves in the direction of the arrows shown in Figs. 1 and 3. On the forward side of the chamber 39, a second chamber 45 is formed having an end wall 46 opposite the wall of the chamber 39 and having side walls 40' which may be continuations of the side walls 40 of the main chamber. Preferably the side walls 40' continue on a substantial distance beyond the wall 46. The chamber 45 may have a bottom 48 which extends beyond the wall 46 to form a seal with the upper surface of the filter bed at the forward end of the cleaning mechanism. It is desirable that a flat surface such as the bottom plate 48 extend a substantial distance forward and rearwardly of the main washing chamber in order to prevent the flow of liquid between the bottom of the cleaner and the upper surface of the bed. The chamber 45 formed above the bottom is not essential in the operation of the cleaner.

A wash water compartment 49 is provided at the rear side of the chamber 39 and is formed by the wall 41 of the main chamber and by the wall 50 opposite thereto, together with the side walls 40" which may be continuations of the walls 40 of the main chamber. The bottom of the chamber 48' serves as a seal at the rear of the cleaner corresponding to a seal 48 at the front of the cleaner. The wall 41 on the rear side of the main chamber 39 has an overflow weir 51 which is adjustable in height by bolts 52 in slots 54. By adjusting the height of the weir 51 the level of the liquid in the cleaner chamber 39 may be regulated. When the level reaches the top of the weir 51 it overflows into the wash water chamber 49 and is pumped out by means of the centrifugal pump 55, driven by shaft 56 and motor 57 mounted on the carriage 8 and supported by channel members 42. A baffle 58 extends across the chamber 39 adjacent to the weir 51. The purpose of this baffle is to prevent the magnetite or other material of the filter bed from being carried upwardly by the flow of water and washed over the dam 51 into the wash water compartment. By forcing the wash water to pass under the baffle 58, any waste of magnetite is minimized.

In order to obtain best results, the material of the filter bed must be loosened so that the filtered water under the bed may flow back more easily through the bed to wash the solids lodged in the filter bed. The better the washing operation, the more solids are removed from the bed and carried by the wash water into the wash water chamber 49. In applicant's prior patent, No. 2,204,534, a magnet is used for raising and dropping the magnetite. In the preferred embodiment of the present invention, a plurality of magnets 59 and 59' are mounted adjacent each other across the filter bed, preferably arranged with alternate north and south poles, and secured together by angle irons 60. It will be understood that other means for engaging and retaining the bed may be utilized, particularly where a non-magnetic material is used for the filter bed. The magnets or other means for retaining portions of the bed during the lifting operation are pivotally connected by links or arms 62 to brackets 64 on the wall 41 of the chamber 39. The links 62 cause the magnets or other bed retaining means to move in the arc of a circle when they are raised, as will be described later. The magnets 59 and 59' are supported by a rod 65 attached to one end of a walking beam 66 keyed to the end of a shaft 67 mounted in bracket 68. The bracket 68 is secured to the channel members 42 of the supporting frame. The opposite end of the walking beam 66 has a counterweight 69 secured thereto by a rod 70. The counterweight 69 should substantially balance the weight of the magnets or retaining means in order to secure smoothness of operation. An arm 71 is keyed to the other end of shaft 67 and connects with a connecting rod 74 which in turn is connected to an arm 75 keyed to the shaft 76 which is driven by motor 78 and a suitable speed reduction gear. The motor 78 through the above described driving connections operates the walking beam 66, to raise and lower the magnets 59 and 59' continuously during the operation of the motor. The links 62 prevent the magnets from being raised directly upwardly and cause them to move toward the rear in their upward movement. Preferably, the component of motion toward the rear is equal to the forward motion of the carriage 8 and the traveling cleaner. In this way, the magnets or other bed retaining means will move directly upwardly with respect to the bed when they are raised; thus when the magnetite is released by switching off the current to the magnet, it will drop back on the bed at the place from which it was removed. The rod 65 has adjustable sleeves 84 thereon permitting it to be lengthened or shortened so that the magnets may be positioned accurately with respect to the top of the bed.

By having a plurality of magnets 59 and 59' mounted side by side, it is possible to use the same magnet construction and the same magnet dimensions for various widths of bed by increasing or decreasing the number of units used. If a unit becomes damaged, it may be removed and replaced at a low cost. Heretofore, a special magnet had to be designed and constructed for each width of bed. The size of the magnets and their air cores made them less effective and less efficient in their action. In case of damage, the entire magnet had to be replaced or repaired. By having iron cores, the windings on the individual units may be much thinner, and it is possible to have the effective portions of the magnets nearer the sides of the filter bed so that a greater portion of the width of the bed may be cleaned. This effectiveness is also increased by utilizing a series of north and south poles. With previous types of magnets, a strip of substantial width on each side of the bed could not be washed or cleaned. With the present multi-unit composed of smaller magnets with iron cores, the bed can be washed nearer the sides, which increases the effectiveness of the cleaner and the efficiency of the filter. With a narrow bed, for example three feet wide, the present construction will clean more than seventy-five percent of the width of the bed, whereas constructions with a single-unit magnet will clean fifty to sixty percent of the width. As the width of the bed is increased, the relative advantage from the standpoint of percentage of the bed cleaned is less, but sufficiently large to be important. The price and cost of filters vary with the area of the filter bed. Since a smaller filter bed may be used with the multi-unit magnet, there is a substantial saving in cost.

Another important advantage of the present construction is the reduction in the size of the magnets and in the current required to operate them due to the separate units with iron cores described above and due to the mechanical lift about to be described. The cost of the magnet is an important element in the price of a traveling cleaner. Applicant has discovered that by mechanically raising and lowering the magnet, the size of the magnet and the current required may be reduced still further and obtain the same or better results. As the magnet is lowered into contact with, or into substantial contact with, the upper surface of the bed, the magnetic lines of force are better able to permeate through the bed and a much lower current and a much smaller winding will serve to hold the desired volume of the upper surface of the filter bed on the magnet. Furthermore, the material may be raised as high as desired by mechanical means, that is, by the walking beam 66, without requiring any additional magnetic strength. Hence a small magnet may be utilized to raise the magnetite any desired height, thereby to wash the filter bed more effectively. The combined mechanical and electrical operation improves the results obtained heretofore by the use of magnetism alone.

The current is applied when the magnet is at the lower end of its up and down movement and should be discontinued just prior to the magnet reaching the upper part of its movement. Any suitable means may be utilized for this purpose. As illustrated herein, a switch mechanism 86 is operated by a shaft 87, sprocket 88, chain 89 and sprocket 90 on the shaft 76, which is the drive for the walking beam. Hence the switch 86 is timed with respect to the movement of the magnet. Preferably the switch 86, as pointed out above, applies the current when the magnet is in its lower position and disconnects it when it is in its upper position. In the preferred embodiment, the switch 86 actually reverses the current for a short period when the magnet is in its upper position in order to bring the current to zero more quickly and to remove any residual magnetism which would tend to cause the particles of the bed to adhere to the magnet. The flow of the current in the reverse direction needs only to be instantaneous. The details of the switch construction have not been included herein as it is claimed only in combination with the other mechanisms and various types of known switches may be utilized for the purpose.

One of the difficult problems in connection with a traveling cleaner is to obtain a seal between the bottom of the cleaner and the filter bed, which does not permit substantial seepage of liquid between the bed and the cleaner. As described above, the weir 51 leading to the wash water chamber 49 is adjusted so that the level of the liquid within the chamber 39 is lower than the level of the liquid over the filter bed and is also lower than the level of the liquid in the effluent channel 5. Thus, there is a back pressure to prevent the wash water in the chamber 39 from escaping either into the effluent through the bed or into the liquid over the bed surrounding the cleaner. Nevertheless, for effective operation, a seal reasonably perfect is desirable in order to maintain a substantial backhead of water. Water seeping between the upper surface of the bed and the cleaner has little or no cleaning effect, while water passing upwardly through the bed into the cleaner is particularly effective on the loosened portions of the bed and to a less extent on the other portions of the bed enclosed by the cleaner.

A preferred embodiment of seal is illustrated herein in Figs. 4 and 5. A strip 92, preferably of rubber, having a length equal to the length of the housing side plate, rests on the upper flange or runway 94 on the sides 19 of the filter bed. The strip 92 is sufficiently wide for its inner edge to rest on extensions 95, which are shown extending from the bottom of the chamber 39 out beyond the sides thereof. If desired, the extensions may be separate plates or bars welded or otherwise secured in place. The upper side of the extension 95 is substantially at the level of the upper surface of the flange 94. The weight of the cleaner is supported by the carriage 8 which minimizes the wear on the seal. The strips 92 at each side of the cleaner are held in position by the difference in water pressure outside the chamber and inside the chamber and are secured to and moved with the cleaner by shoes 91 vulcanized or otherwise secured to the upper surface of the strip 92 at suitable intervals. Bolts 96 extend through the housing side plate 40 and through one side of an angle iron 97 attached to the exterior of the side plate 40 and fit into recesses 98 in the T-bar forming the shoes 91. Thus the traveling cleaner carries sealing members 19 along with it in firm sealing contact with the sides of the filter bed. The sealing strip may be turned around to equalize the wear on its respective sides and may be replaced when worn out. This seal has been found to be efficient and effective in preventing the passage of liquid about the sides of the cleaner. The extended bottoms 48 and 48' furnish effective seals at the ends of the cleaner.

It is desirable that the operation of the traveling cleaner be automatic. Such cleaners usually run twenty-four hours a day and constant watching is objectionable. When the filter bed is cleaned, the liquid will pass through it at a rapid rate. As the interstices in the bed clog, the rate of flow decreases and the level of the liquid in the settling chamber increases under normal working conditions. Hence, the level of the liquid in the settling chamber is an indicator of whether or not the bed is clean. In the preferred embodiment, an automatic switch is provided for starting the traveling cleaner whenever the liquid in the settling chamber exceeds a predetermined height. For this purpose, there is provided (Figs. 1 and 6) a vertical reservoir 100 connected through a conduit 101 with the liquid in the settling chamber. It may, if desired, be connected with the liquid above the filter bed. A float 102 rises and falls with the change in level of the liquid in the reservoir 100, which corresponds with the level of the liquid in the settling chamber. A rod 104 extends through the float and has spaced enlargements 107 which engage an arm 105 to operate an electric switch 106. As the float moves downwardly, the arm 105 is moved to its lower position to open the switch 106 and when the float moves upwardly, the arm is moved to its upper position to close the switch and to start the cleaner. The distance that the enlargements 107 are apart determines the neutral zone which neither opens nor closes the switch. In other words, the distance between the enlargements determines the permissible variation in level of the liquid in the settling chamber.

Cooperating with the float switch is a switch 108 (Fig. 1) which is closed by an extension 109 on the carriage each time the carriage passes it. In this way, the carriage automatically stops at that point unless the float switch is in its upper position.

A modified construction of the magnet is illustrated in Fig. 7, where the magnet 59a is shown with a lower surface having a series of projections. These projections may be of any desired length, preferably sufficiently long to project a substantial distance into the upper surface of the filter bed 21, when the magnet is lowered to its extreme position. The projections extending into the surface of the filter bed enables the magnet to be more effective in raising and holding magnetite. The projections 114 may be tooth-like projections or ribs extending along the surface of the magnet. A magnet of this type could be used without the lifting mechanism by allowing the projections to agitate the upper surface of the bed. While this would be an improvement upon prior constructions, the lifting mechanism is a still further improvement and therefore, should be used.

While the above description is directed to the invention as applied to a magnetite filter, the invention is also applicable to other types of filter beds. For example, the upper surface of a rapid sand filter may be covered with magnetite and a large magnet utilized to lift the magnetite and the filtered solids off of the top of the bed. The magnets described above cannot be used for raising non-magnetic material but other types of retaining means may be utilized. For example, in Fig. 8 a retaining device 59b is shown having a concave lower surface as shown in dotted lines at 115. A conduit or tube 116 connects with the cavity formed in the lower surface. A check valve 117 may permit escape of air upwardly through the conduit and prevent entrance of air through the conduit into the cavity. In operation, the lower outer edge 113 of the device 59b is forced into the bed by the raising and lowering mechanism shown in Figs. 2 and 3. When the device 59b is then raised, a vacuum will be formed which will hold a portion of the bed in the cavity. The vacuum may be broken by opening the valve 117 and the raised portions of the bed will be dropped. If sufficient vacuum for holding the bed material is not automatically formed in the above operation, the conduit 116 may be connected to a source of vacuum to be applied when the device 59b is in its lower position and released when in its upper position in substantially the same manner as the electric current is switched on and off in the preferred embodiment. In fact, electric magnets may be utilized for operating valves to render the vacuum effective and ineffective on the cavity. The device 59b illustrates the application of the invention to filter beds formed of non-magnetic material.

With magnetite filter beds, the magnetic and suction retaining devices may be combined to give greater holding power. This may be done by making the device 59b in the form of a magnet. The magnetite will then be retained in the cavity by the magnetic holding power of the magnet and by the partial vacuum created in the cavity.

The combined magnetic and vacuum principle illustrated in Fig. 8 is shown applied in Fig. 9 to a plurality of opposite magnetic poles. The magnetic poles 59c and 59d have their lower surfaces hollowed as shown at 116a and 116b, with a continuous peripheral edge 113 adapted to extend into the surface of the bed. In order to preserve the continuity of the outer peripheral edge 117, the space between the two poles of the magnet may be filled by a section 118 of a non-magnetic material such as brass. This section of material causes the magnetic lines of force to travel from one pole to the other through the magnetite contained in the cavity.

In Fig. 10, a slightly different construction is shown which is applicable either to the construction shown in Fig. 8 or to the one shown in Fig. 9. In this modified construction, the peripheral edge 117a is of uniform width forming a substantially rectangular cavity 119.

The poles of the magnets described herein are preferably rectangular. However, there is no intention of limiting the invention to poles of any particular shape. The details of the winding of the several magnets are not illustrated. It will be understood that the windings may be of the usual type adapted to be immersed in liquid or they may be sufficiently removed from the lower ends of the poles to be above the level of the water. The multiple units simplify the construction of the magnets, and reduce their cost and increase their effectiveness, hence they are preferable. However, many features of the invention are applicable to a single unit magnet.

In the operation of the filter, a liquid to be filtered is delivered through the inlet 15 to the settling tank 1. As the level of the liquid rises in the settling tank, it overflows through the recesses 16 of the wall 4 into the filtration channel 2. The liquid then passes downwardly through the filter bed 21 and through the screen 22 at the bottom thereof into the channel 25 which leads to the effluent channel 5. When the liquid in the effluent channel rises to a height greater than the level of the weir 26, it flows over the weir into an outlet conduit to be conducted to any suitable reservoir or disposal point. As the filter bed becomes clogged with filtered solids, in the upper surface thereof, the rapidity of flow through the bed will decrease and the height of the liquid above the bed will increase. The level of the liquid in the float chamber 100 (Figs. 1 and 6) being the same as that in the settling chamber, will raise the float 102 responsive to the level of the liquid above the filter bed. When raised to a predetermined extent, the float 102 through the rod 104 and lower projection 107 will close the switch 106. The motor 32 will be started to operate the carriage about its pivot 9. The motor 78 will also be started and will raise and lower the magnet 59 through the intermediation of reduction gear 82, shaft 76 driven thereby, arm 75, connecting rod 74, arm 71, shaft 67, walking beam 66 and rod 65 attached to the magnets 59 and 59'. The arms 62 pivoted to the magnets and to the brackets 64 on the wall 41 cause the magnets to move rearwardly at the time they move upwardly so that the component of horizontal movement is equal and opposite to the forward movement of the cleaner. This permits the portion of the bed raised by the magnets to be dropped back into the same position which it previously had. A switch 86, controlling the current to the magnets, is operated by sprocket 88 thereon, chain 89 and sprocket 90 on the reduction gear so that current is passed through the magnets when they are in their lowered position and continues to pass through the magnets until they reach substantially their upper position. The current at that point is shut off to permit the magnetite to drop back on the filter bed and preferably the switch 86 reverses the current for an instant to eliminate any residual magnetism and to assure complete release of the magnetite. In falling to the bed through the water over the bed, the magnetite is washed and the solids, which are lighter than the magnetite, are removed from it. Due to the fact that the level of the liquid in the effluent channel (controlled by adjustable weir 26) is higher than the level of the liquid in the cleaner chamber 39 (controlled by the adjustable weir 51) filtered liquid will flow upwardly through the filter bed into the chamber 39 of the cleaner. The upflow of liquid will cooperate in washing the falling magnetite and will carry the solids removed therefrom. The lifting of the magnetite may cause a localized reduction in the thickness of the bed or a substantially complete removal of the magnetite under the magnet from the screen, whichever is desired. In either case, there is an upward rush of effluent through the area of the bed beneath the magnet for washing purposes. The solids removed pass with the wash water under the baffle wall 58 over the weir 51 into the wash water chamber 49. From there, the wash water is pumped by the centrifugal pump 55 and motor back into the settling tank to be passed through the filter a second time after the solids coagulated in the filter are permitted to settle. The finer solids trapped by the filter but not sufficiently coagulated to settle out when returned to the settling tank have another chance to do so when caught a second time in the filter.

When the cleaner completes a cycle, that is, passes completely around the circular filter bed 21, the member 109 (Fig. 1) thereon engages the switch 108, which opens the electric circuit through the wire 108'. If the float 102 (Figs. 1 and 6) is sufficiently high that the switch 106 is closed, the electric circuit will be closed through wire 113 and the opening of the circuit through wire 108', which is connected in parallel with wire 113 will have no effect. The cleaner will, therefore, continue to operate until the level of the liquid in the settling chamber is sufficiently low to open switch 106. If the float 102 (Figs. 1 and 6) is sufficiently low that the switch 106 is open when the member 109 opens switch 108, the circuits through both of the wires 108' and 113 will be open and the cleaner will stop until the float 102 again reaches its upper position and closes switch 106. In this manner, the carriage 8 stops in the same position each time the automatic switches stop it.

The churning of the water by the raising and lowering of the magnet contributes to the washing of the material raised. In addition, by raising the magnets mechanically, the amount of current and the size of the magnets are reduced greatly. The magnetic force required to raise an article increases with the distance that the article is from the surface of the magnet. By permitting the articles to be substantially in contact with the surface of the magnet, the magnetic force required is minimized without in any way affecting the quantity of the material raised. In fact, a larger quantity of material can be raised with a much smaller magnet, thereby greatly increasing the effectiveness of the filter. It is possible to have the magnet effective to a greater depth of the bed, that is, to have the magnet raise a greater thickness of the bed or the entire thickness of the bed. The several forms of magnet illustrated have the advantages pointed out in their respective descriptions.

Where the bed is made of non-magnetic material, mechanical means may be utilized for raising and dropping portions of the bed or the entire depth thereof. For example, the mechanisms illustrated in Figs. 8 and 10 may be vacuum operated to retain a portion of the bed in the cavities on the lower surface thereof during the raising operation as described more fully with reference to said figures.

The improved seal for the traveling cleaner, shown more particularly in Fig. 4, effectively prevents seepage into the chamber 39 of liquid surrounding the cleaner. In some instances, it may be desirable to have the present cleaner effective upon only a small depth of the upper surface of the bed. This may be done by reducing the amount of current passing through the magnet or by adjusting through the sleeve 84 on rod 65 the distance that the magnet or other retaining device goes down on its downward stroke. In this way, only the upper surface of the bed is cleaned. After a period of time, the lower depth will need to be cleaned also. At that time, the current may be increased or the distance that the magnet goes down may be increased to raise a greater depth of the surface of the filter bed. Both methods may be used if desired. In some cases, a separate traveling cleaner may be desired for the full depth cleaning. In other cases, a plurality of cleaners may be desired where the bed is unusually long.

It will be seen that the present invention provides an improved cleaner for filter beds and the like automatic in its operation and adapted to clean beds while they are being used for filtering liquids. The cost of the construction is reduced by the use of a multi-unit magnet and by the use of mechanical means for lifting the magnet. By reason of the greater efficiency and lower cost, the range of utility of the filter is greatly increased. A smaller filter may be utilized for jobs which heretofore required a large filter. The parts are rugged in construction and are fully capable of withstanding the rough usage to which devices of this kind are subjected.

As various changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described my invention, I claim:

1. In a clarification filter, the combination of a filter bed formed of particles adapted to be raised by magnetic action, a traveling cleaner therefor, means within said cleaner including an electromagnet for raising, holding and dropping a mass of said particles by magnetic action to facilitate removal of objectionable matter therefrom, means for energizing and de-energizing said electromagnet and means for raising said magnet while a mass of particles is held thereon to minimize the distance that the particles have to be raised by magnetic action.

2. In a clarification filter, the combination of a filter bed formed of particles adapted to be raised by a magnet, means for sealing off a localized area of said filter bed, an electromagnet having an iron core for attracting and holding said particles in said localized area of the bed, means for energizing and de-energizing said electromagnet periodically to hold and release particles to facilitate removal of extraneous matter therefrom and means for raising said magnet together with the particles held thereby whereby the particles may be dropped therefrom.

3. In a filter, the combination of a filter bed of particles of magnetite, an electromagnet, traveling means for supporting said magnet directly above the bed and for moving said magnet over the bed in close proximity to the upper surface thereof, means for energizing said magnet periodically to raise particles from the upper portion of the bed to facilitate removal of extraneous matter therefrom, and means for raising said magnet and the particles thereon to minimize the distance that the particles have to be raised by magnetic action.

4. In a device of the class described, the combination of a filter bed formed of particles adapted to be raised by magnetic action, a traveling cleaner adapted substantially to seal off a portion of said bed from the rest thereof, a magnet effective upon the sealed off area of the bed, and means for raising and lowering said magnet to raise the particles on the upper surface of the enclosed portion, thereby to facilitate the removal of extraneous matter therefrom.

5. In a device of the class described, the combination of a filter bed formed of particles adapted to be raised by magnetic action, a traveling cleaner adapted substantially to seal off a portion of said bed from the rest thereof, a magnet effective upon the sealed off area of the bed, means for raising and lowering said magnet to raise the particles on the upper surface of the enclosed portion, thereby to facilitate the removal of extraneous matter therefrom, means for flowing liquid through the raised particles for washing purposes, and means for removing the wash liquid from the cleaner.

6. In a downflow filter, the combination of a filter bed formed in part at least of particles adapted to be raised by a magnet, a traveling cleaner adapted to seal off a portion of the filter bed, a magnet within said cleaner effective upon a portion of the bed enclosed thereby, means for raising and lowering said magnet to agitate the particles at the upper part of said bed, and means for flowing a liquid into said cleaner and removing said liquid therefrom to wash the raised particles.

7. In a downflow filter, the combination of a filter bed formed of a magnetic material such as magnetite, a traveling cleaner adapted to travel over said filter bed and seal off successive portions thereof from other portions, a magnet in said cleaner effective upon the particles of the bed enclosed thereby, means for raising and lowering said magnet to raise particles from the bed, and means for delivering liquid upward through the bed into said cleaner and for removing the liquid from the cleaner to wash the raised particles.

8. In a filter cleaner adapted to travel over a filter bed, the combination of means for raising a portion of the upper surface of said bed, devices for supporting said means adjacent the upper surface of said bed and for moving said means over the bed, mechanism for raising said means periodically to raise particles from the upper surface of the bed, said mechanism being adapted to move said means laterally in a direction opposite to the lateral movement of said means, thereby to neutralize the said lateral movement so that the particles may be dropped into that portion of the bed from which they were removed.

9. In a device for cleaning a filter bed formed of magnetizable particles, the combination of a traveling cleaner adapted to pass over said bed, a magnet within said cleaner, means for raising said magnet to raise a portion of the material from the upper surface of the bed, and mechanism for moving said magnet laterally in a direction opposite to the motion of the cleaner to permit said raised particles to be dropped on the portion of the bed from which they were removed.

10. In a clarification filter, the combination of a filter bed formed of particles adapted to be raised by a magnet, an electromagnet for raising the particles of the upper surface of the bed, means for flowing current to energize said electromagnet to raise said particles, and means for reversing the flow of current through said magnet to de-energize the same and to obtain a quick release of the particles on the magnet.

11. In a clarification filter, the combination of a filter bed, a traveling cleaner adapted to travel laterally over said bed in contact therewith to seal off successive portions thereof, means within said cleaner for engaging and holding a portion of said filter bed, devices for raising and lowering said engaging and holding means, means for periodically rendering said engaging and holding means effective to hold the particles while substantially in its lower position and for periodically rendering said engaging and holding means ineffective to hold the portion of the filter bed after it has been raised thereby to drop the particles on the sealed off portion of the filter bed within the cleaner.

12. A filter as defined in claim 11, which includes means to cause liquid to flow upward through the sealed off portion of the bed to wash the raised particles.

13. A filter as defined in claim 11, in which the engaging and holding means includes a device for forming a partial vacuum for holding a portion of the bed thereon.

14. In a cleaner for cleaning a filter bed formed in part at least of magnetic material, the combination of a traveling cleaner adapted to travel over said bed, a series of individual magnets forming replaceable units within said cleaner for engaging and holding a portion of said filter bed, devices for raising and lowering said magnets, means for rendering said magnets effective to hold the particles while substantially in their lower positions, and means for rendering said magnets ineffective to hold the portion of the filter bed after they have been raised thereby to drop the particles of the filter bed therefrom.

15. In a cleaner for cleaning a filter bed formed in part at least of magnetic material, the combination of a traveling cleaner adapted to travel over said bed, a magnet having a series of projections thereon for engaging and holding a portion of said filter bed, said magnet being within said cleaner, devices for raising and lowering said magnet, means for rendering said magnet effective to hold the particles while substantially in its lower position and means for rendering said magnet ineffective to hold the portion of the filter bed after it has been raised to drop the particles of the filter bed therefrom.

16. In a filter, the combination of a filter bed, runways at the sides of the filter bed, a traveling cleaner having lateral extensions at its sides adjacent the filter bed terminating respectively adjacent the surfaces of said runways with a gap therebetween, means for supporting the traveling cleaner over the filter bed, shoes formed of a resilient material secured to said cleaner to bridge the said gaps, said shoes being free for limited vertical movement with respect to the cleaner to prevent the traveling cleaner from applying pressure to the shoes and to minimize wear thereon, said shoes making contact with said extensions and making a sliding contact with said runways to form a seal along the sides of the cleaner.

17. In a filter cleaner adapted to travel over a filter bed formed in part at least, of particles adapted to be raised by magnetic action the combination of an electro-magnet, traveling means for supporting said magnet directly above the bed and for moving said magnet over the bed in close proximity to the upper surface thereof, means for energizing said magnet periodically to raise particles from the upper portion of the bed to facilitate removal of extraneous matter therefrom and for de-energizing the magnet to drop the particles therefrom, and means for raising said magnet and the particles thereon to minimize the distance that the particles have to be raised by magnetic action.

18. In a filter cleaner adapted to travel over a filter bed formed in part at least, of particles adapted to be raised by magnetic action, a traveling cleaner adapted to seal off a portion of the filter bed, an electro-magnet within said cleaner, effective upon a portion of the bed enclosed thereby, an electric circuit for said electro-magnet, and means for opening and closing said circuit to energize and de-energize the electro-magnet means for raising and lowering said magnet to agitate the particles at the upper part of said bed and means for removing liquid from the cleaner.

19. In a clarification filter, the combination of a filter bed formed of particles adapted to be raised by magnetic action and means including an electromagnet having a substantial cavity in its undersurface adapted to be filled by said particles, said cavity supplementing the electromagnetic action in holding the particles by the formation of a partial vacuum.

20. In a clarification filter, the combination of a filter bed formed of particles and means having a substantial cavity in its undersurface adapted to be filled by said particles, said cavity forming a partial vacuum tending to hold the particles therein when said means is raised.

21. In a clarification filter, the combination of a filter bed formed of particles, means having a cavity in the undersurface thereof, devices for forcing said means into the surface of the filter bed and for raising the same, and valve means operatively connected to said cavity to relieve any pressure formed therein and permitting the formation of a partial vacuum in the cavity tending to hold the particles in the cavity.

22. In a clarification filter, the combination of a filter bed formed of particles, an electromagnet having a cavity in the undersurface thereof, devices for forcing said electromagnet into the surface of the filter bed and for raising the same, and valve means operatively connected to said cavity to relieve any pressure formed therein and permitting the formation of a partial vacuum in the cavity tending to hold the particles in the cavity.

CHARLES E. FRASER.